US012632305B2

(12) United States Patent
Agarwal et al.

(10) Patent No.: US 12,632,305 B2
(45) Date of Patent: May 19, 2026

(54) INCREMENTAL ANALYSIS OF LEGACY APPLICATIONS

(71) Applicant: INTERNATIONAL BUSINESS MACHINES CORPORATION, Armonk, NY (US)

(72) Inventors: Shivali Agarwal, Ghaziabad (IN); Saravanan Krishnan, Bangalore (IN); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 17/648,231

(22) Filed: Jan. 18, 2022

(65) Prior Publication Data

US 2023/0229508 A1 Jul. 20, 2023

(51) Int. Cl.
*G06F 9/50* (2006.01)

(52) U.S. Cl.
CPC .......... *G06F 9/5033* (2013.01); *G06F 9/5044* (2013.01); *G06F 9/5055* (2013.01)

(58) Field of Classification Search
CPC ..... G06F 9/5033; G06F 9/5044; G06F 9/5055
See application file for complete search history.

(56) References Cited

U.S. PATENT DOCUMENTS

| | | | | | |
|---|---|---|---|---|---|
| 8,671,397 | B2 * | 3/2014 | Kalman | .................... | G06F 8/75 |
| | | | | | 717/133 |
| 8,762,949 | B2 * | 6/2014 | Conway | .................... | G06F 8/73 |
| | | | | | 717/126 |

| | | | | | |
|---|---|---|---|---|---|
| 9,495,211 | B1 * | 11/2016 | Helstroom | ............ | G06F 9/5016 |
| 10,162,610 | B2 | 12/2018 | Apte | | |
| 10,163,066 | B1 * | 12/2018 | Wertheimer | ..... | G06Q 10/06313 |
| 11,042,369 | B1 | 6/2021 | Kimball | | |
| 2009/0193063 | A1 | 7/2009 | Leroux | | |
| 2014/0047119 | A1 * | 2/2014 | Wong | .................... | G06F 9/5016 |
| | | | | | 709/226 |
| 2019/0250912 | A1 | 8/2019 | Gavisiddappa Kodigenahalli | | |
| 2020/0019381 | A1 * | 1/2020 | Patel | ........................ | G06F 8/71 |
| 2022/0075660 | A1 * | 3/2022 | Beare | .................... | G06F 9/5044 |

OTHER PUBLICATIONS

Thomas J. Marlowe, Barbara G. Ryder, An efficient hybrid algorithm for incremental data flow analysis (Year: 1990).*
Chris Janes, ImperfectDev, The roles and industries that utilize static code analysis. (Year: 2023).*

(Continued)

*Primary Examiner* — Lewis A Bullock, Jr.
*Assistant Examiner* — Carlos Alberto Espana
(74) *Attorney, Agent, or Firm* — Daniel M. Yeates

(57) ABSTRACT

A method, system, and computer program product for automated increment analysis of legacy applications are provided. The method receives a set of service properties for a service to be generated from a set of applications. The set of applications are associated with a set of resources. A subset of resources are determined based on the set of service properties. The subset of resources are to be included in the service. A resource graph of the subset of resources is generated based on the subset of resources and the set of service properties. The method generates a service increment including at least a portion of the subset of resources based on the resource graph and the set of service properties.

18 Claims, 6 Drawing Sheets

(56) References Cited

OTHER PUBLICATIONS

Amra et al., "Modernizing IBM i Applications from the Database up to the User Interface and Everything in Between," Redbooks, Jun. 2014, 702 pages, First Edition, IBM.

Dorda et al., "A Survey of Legacy System Modernization Approaches" Apr. 2000, 30 pages, Carnegie Mellon Software Engineering Institute, US.

Dorda et al., "Incremental Modernization of Legacy Systems," CMU/SEI-2001-TN-006, Jul. 2001, 29 pages, Carnegie Melon University, US.

Mell et al., "The NIST Definition of Cloud Computing," Recommendations of the National Institute of Standards and Technology, U.S. Department of Commerce, Special Publication 800-145, Sep. 2011, 7 pgs.

Strong, "Migrating the Monolith to the Cloud with Incremental Application Modernization," Sep. 23, 2019, 11 pages.

Tritchew, A Multi-Step Incremental Approach to Modernization (Step 2: Create Options—"How will we Modernize"), Sep. 8, 2021, 8 pages.

* cited by examiner

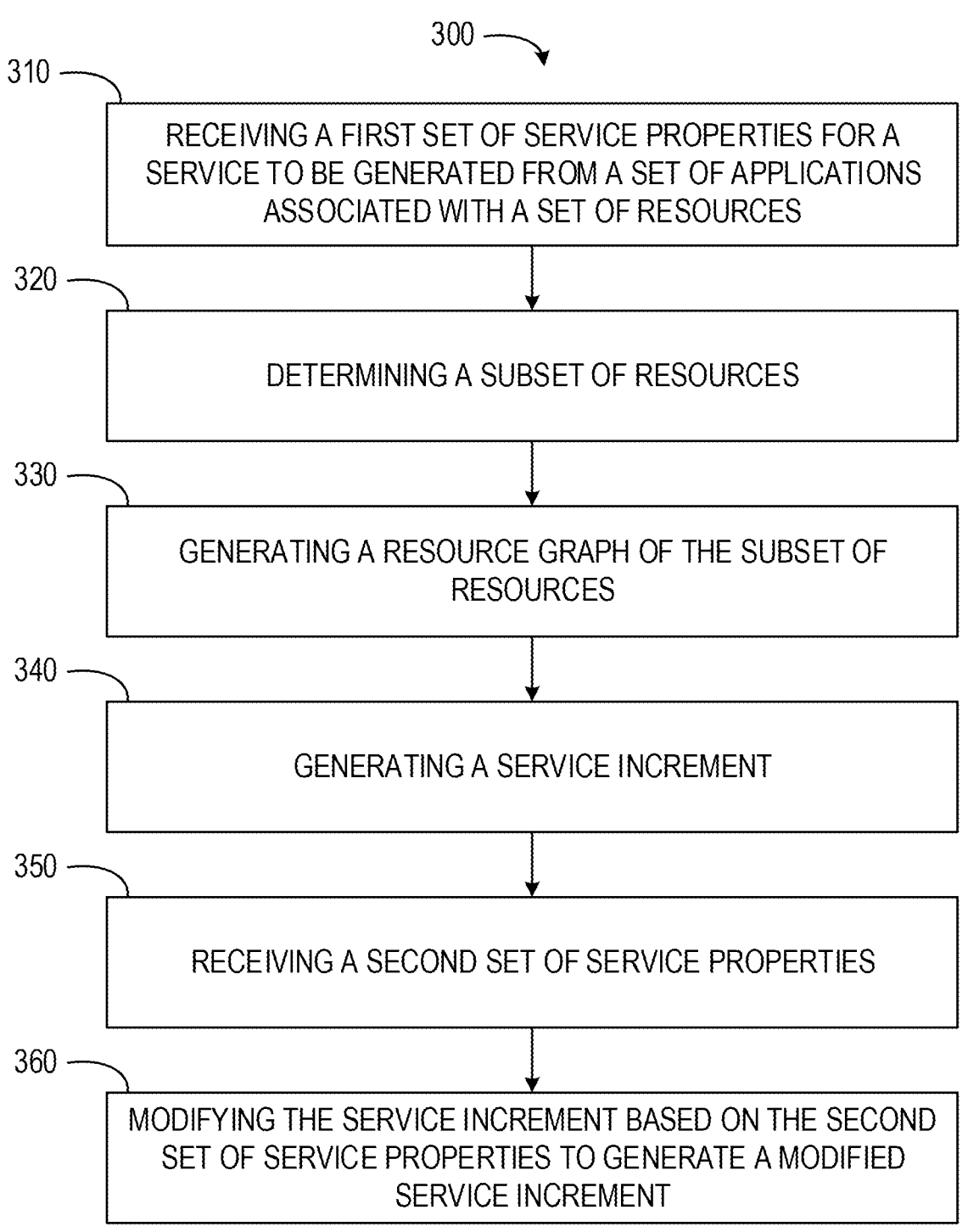

300

310 — RECEIVING A FIRST SET OF SERVICE PROPERTIES FOR A SERVICE TO BE GENERATED FROM A SET OF APPLICATIONS ASSOCIATED WITH A SET OF RESOURCES

320 — DETERMINING A SUBSET OF RESOURCES

330 — GENERATING A RESOURCE GRAPH OF THE SUBSET OF RESOURCES

340 — GENERATING A SERVICE INCREMENT

350 — RECEIVING A SECOND SET OF SERVICE PROPERTIES

360 — MODIFYING THE SERVICE INCREMENT BASED ON THE SECOND SET OF SERVICE PROPERTIES TO GENERATE A MODIFIED SERVICE INCREMENT

FIG. 3

INCREMENTAL ANALYSIS OF LEGACY APPLICATIONS

BACKGROUND

Software systems often consist of hundreds of applications. Each of these applications can comprise thousands of jobs, programs, and transactions. Applications, jobs, and programs within a software system may interact with each other through shared memory, shared files, shared tables, messaging queues, and other suitable functions. As software systems age and computing functionality advances, individual applications, jobs, programs, or entire software systems may become legacy systems.

SUMMARY

According to an embodiment described herein, a computer-implemented method for automated increment analysis of legacy applications is provided. The method receives a set of service properties for a service to be generated from a set of applications. The set of applications are associated with a set of resources. A subset of resources are determined based on the set of service properties. The subset of resources are to be included in the service. A resource graph of the subset of resources is generated based on the subset of resources and the set of service properties. The method generates a service increment including at least a portion of the subset of resources based on the resource graph and the set of service properties.

According to an embodiment described herein, a system for automated increment analysis of legacy applications is provided. The system includes one or more processors and a computer-readable storage medium, coupled to the one or more processors, storing program instructions that, when executed by the one or more processors, cause the one or more processors to perform operations. The operations receive a set of service properties for a service to be generated from a set of applications. The set of applications are associated with a set of resources. A subset of resources are determined based on the set of service properties. The subset of resources are to be included in the service. A resource graph of the subset of resources is generated based on the subset of resources and the set of service properties. The operations generate a service increment including at least a portion of the subset of resources based on the resource graph and the set of service properties.

According to an embodiment described herein, a computer program product for automated increment analysis of legacy applications is provided. The computer program product includes a computer-readable storage medium having program instructions embodied therewith, the program instructions being executable by one or more processors to cause the one or more processors to receive a set of service properties for a service to be generated from a set of applications. The set of applications are associated with a set of resources. A subset of resources are determined based on the set of service properties. The subset of resources are to be included in the service. A resource graph of the subset of resources is generated based on the subset of resources and the set of service properties. The computer program product generates a service increment including at least a portion of the subset of resources based on the resource graph and the set of service properties.

BRIEF DESCRIPTION OF THE DRAWINGS

FIG. 3 depicts a flow diagram of a computer-implemented method for automated increment analysis of legacy applications, according to at least one embodiment.

DETAILED DESCRIPTION

Figure 1:
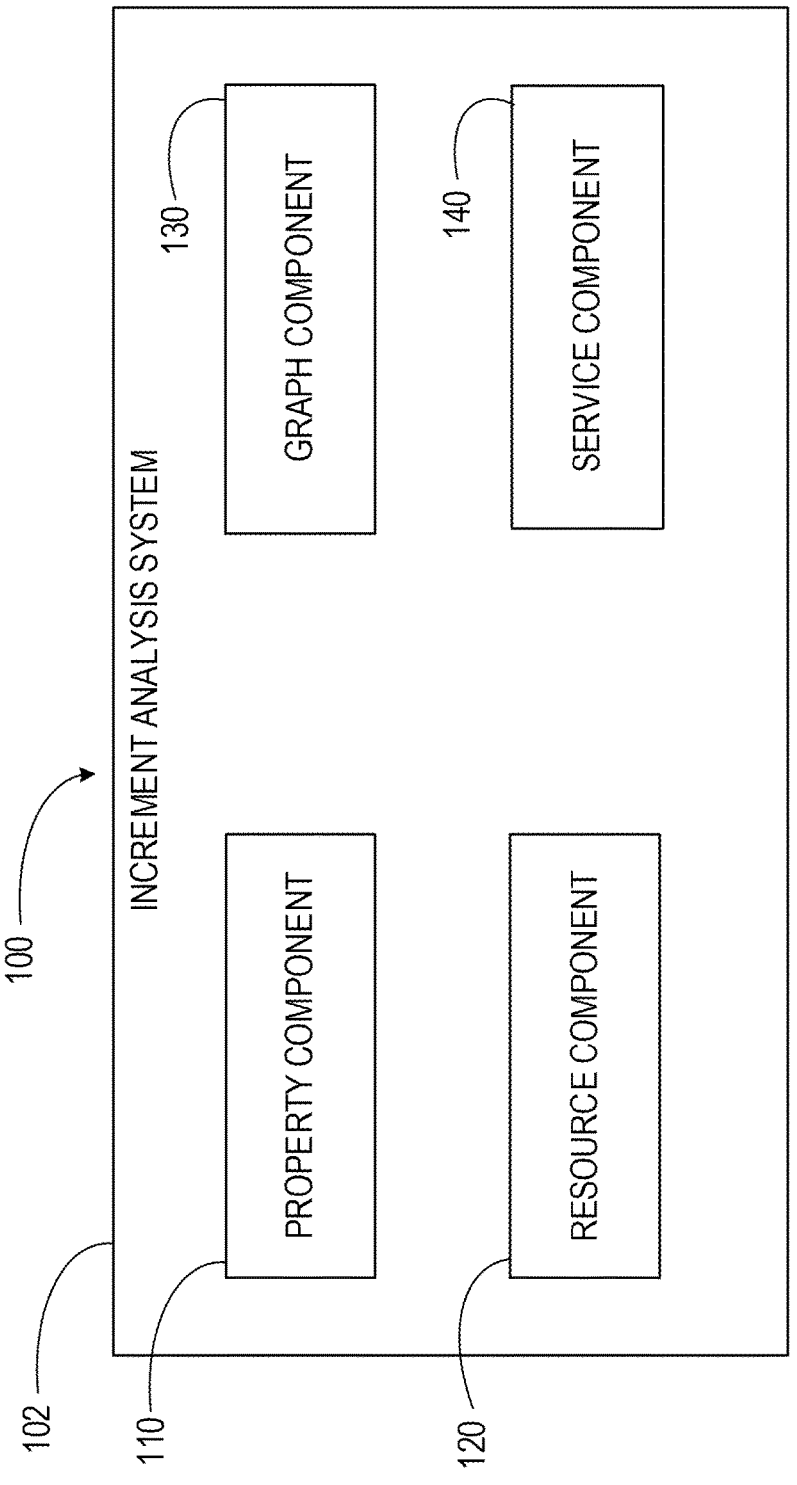
FIG. 1 depicts a block diagram of a computing environment for implementing concepts and computer-based methods, according to at least one embodiment.

The present disclosure relates generally to methods for automated increment analysis of legacy applications. More particularly, but not exclusively, embodiments of the present disclosure relate to a computer-implemented method for constraint-based and objective-based automated identification of increments and dependencies within legacy applications for service-based modernization. The present disclosure relates further to a related system for automated increment analysis of legacy applications, and a computer program product for operating such a system.

Software systems often consist of hundreds of applications. Each of these applications can comprise thousands of jobs, programs, and transactions. Applications, jobs, and programs within a software system may interact with each other through shared memory, shared files, shared tables, messaging queues, and other suitable functions. These software systems, applications, jobs, and programs may be created using mainframe technologies, programming languages, or frameworks that enable performance of desired functions. For example, business functionality and processes may invoke multiple transactions and jobs across applications. Applications within legacy systems may be designed to cohesively perform certain tasks in a complete business process.

As software systems age and computing functionality advances, individual applications, jobs, programs, or entire software systems may become legacy systems. While legacy systems may retain functionality and use, the technologies, programming languages, or frameworks of legacy systems may fall short and benefit from modernization. For example, the technologies used to create legacy systems may benefit or require modernization to suitably interact with newly developed software, applications, or systems.

Legacy systems may be modernized by breaking the systems into services. Some approaches modernize legacy systems in phases. Each phase involves considerable refactoring and rewriting code in more modern languages to leverage the previous benefits of the legacy systems within a new infrastructure, such as the cloud. Current approaches perform manual modernization. Manual modernization relies heavily on knowledge of subject matter experts and application developers. Full knowledge of these legacy systems may not be passed along during years of implementation, thus limiting knowledge of the subject matter experts and developers. Tools for manual modernization are often static analysis tools. Manual modernization efforts are often associated with high costs and maintenance. Due to cost and effort considerations, manual modernization efforts are often considered or selected based on criticality of functions, cost of modernization, skill gaps, interface dependencies, and other factors. These factors may result in some phases or portions of modernization being delayed or refused in favor of newer solutions despite lesser functionality. Further, current approaches do not allow users to perform incremental analysis of applications by automatically scoping the application using transactions and code-artifacts in the context of different types of logical boundaries. Finally, no current approaches exist to allow users to specify design constraints and objectives to determine incremental scope of modernization of applications.

Embodiments of the present disclosure enable application modernization of legacy applications and functionality written in non-modern languages or using mainframe technologies. Portions of an implemented legacy system are automatically determined. These automatically determined portions are increments or service increments. Embodiments of the present disclosure provide analysis functionality to enable application modernization by including highly dependent entities into an increment to minimize external dependencies and meet constraints and objectives of the incremental modernization. Some embodiments of the present disclosure determine the increments based on specified constraints and objectives. Embodiments of the present disclosure incorporate constraints as a part of incremental analysis of the code of the legacy system to be modernized. Embodiments of the present disclosure enable users to define a scope of modernization by user guided increments in a generic manner. Some embodiments of the present disclosure enable developers to incrementally or interactively design a scope of services to meet a modernization goal. Embodiments of the present disclosure automatically identify boundaries among services or increments. Embodiments of the present disclosure automatically determine external and internal resources and aspects of increment scope based on identified boundaries. Embodiments of the present disclosure enable incremental analysis of applications by automatically scoping the application using artifacts, constraints, and objectives within a context of logical boundaries. Some embodiments of the present disclosure enable identification of portions of code or tables that allow for minimal dependency trees based on size, depth, and cross domain calls of or within the tree. Embodiments of the present disclosure identify portions of migratable code which fit into a specified schema concerning size, complexity, organization dependency, and domain.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an increment analysis system 102. The increment analysis system 102 may comprise a property component 110, a resource component 120, a graph component 130, and a service component 140. The property component 110 receives service properties for services to be generated from existing applications. The resource component 120 determines subsets of resources and resource dependencies from sets of resources associated with existing applications. The graph component 130 generates resource graphs from subsets of resources identified for services defined by service properties. The service component 140 generates service increments from resource graphs and sets of service properties. Although described with distinct components, it should be understood that, in at least some embodiments, components may be combined or divided, and/or additional components may be added without departing from the scope of the present disclosure.

Figure 2:
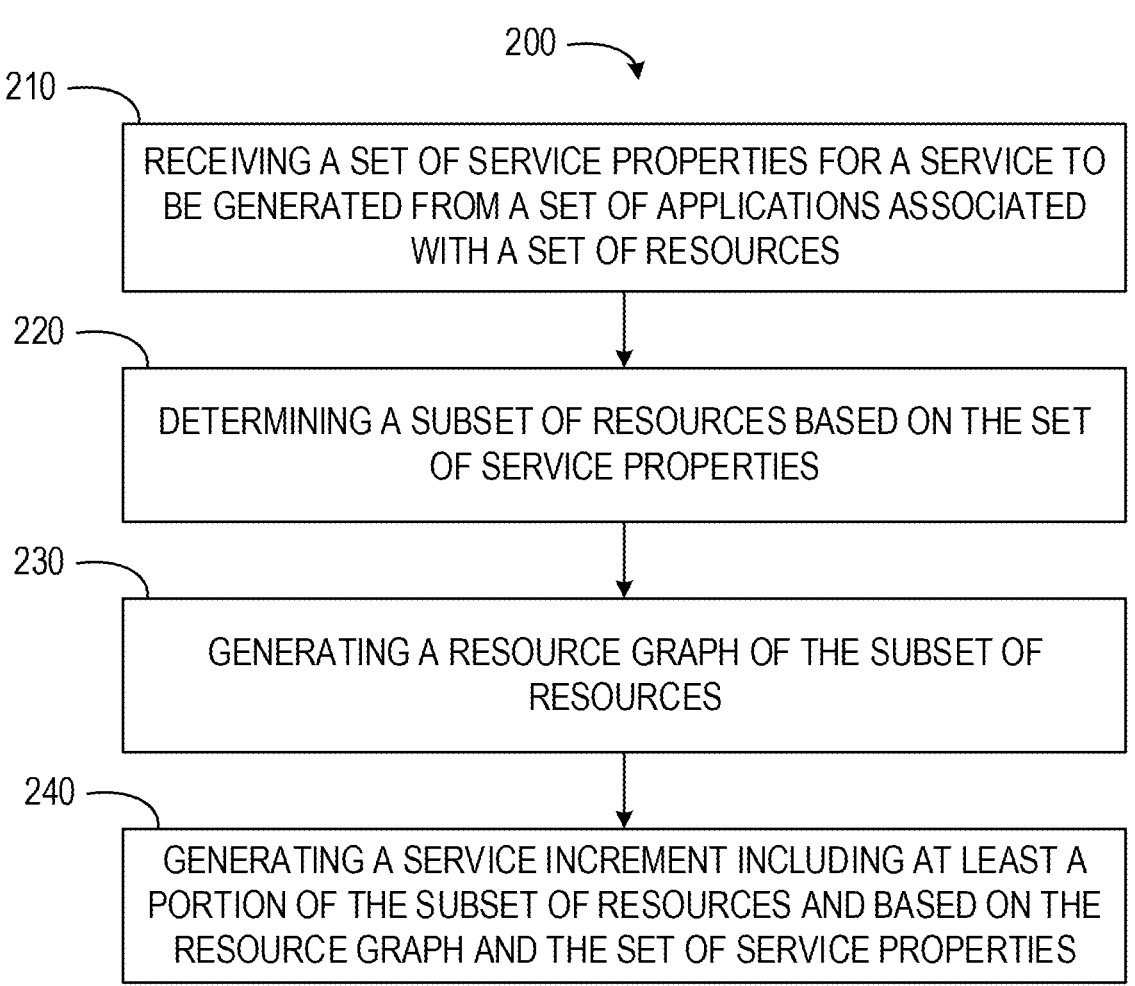
FIG. 2 depicts a flow diagram of a computer-implemented method for automated increment analysis of legacy applications, according to at least one embodiment.

Referring now to FIG. 2, a flow diagram of a computer-implemented method 200 is shown. The computer-implemented method 200 is a method for automated increment analysis of legacy applications. In some embodiments, the computer-implemented method 200 may be performed by one or more components of the computing environment 100, as described in more detail below.

At operation 210, the property component 110 receives a set of service properties for a service. In some embodiments, the service is a service to be generated from a set of applications. The set of applications may be associated with a set of resources. The set of service properties may be properties selected by a user as desired properties of an increment to be generated by the increment analysis system 102. The set of service properties may be selected in a constraint specification mechanism.

In some embodiments, the set of service properties are specified as a set of objectives and a set of constraints of the service. The set of objectives and the set of constraints may inform or define generation of a service increment from an application or a plurality of applications identified within the set of applications. In some instances, the constraint specification mechanism, using the set of objectives and the set of constraints may be used for expressing desired properties of an increment. The desired properties of the increment may then be used to convert an optimization problem, used as an input, to a constraint solver.

The set of service properties may be grouped under constraints and objectives. In some embodiments, constraints are organized under constraint classes. Objectives may be organized under objective classes. Constraint classes may include property types, entity types, aggregation, constraint type, and relationship type. Property type classes may include database access, complexity, operational, boundary, and any other suitable property type. Entity type classes may include program, transaction, application, table, and any other suitable entity type. Aggregation classes may include single, all, group, group by attribute, and any other suitable aggregation type. Constraint type classes may include equal, not exist, less, subset, and any other suitable constraint type. Relation type classes may include write access, read access, outsideIn, belongsTo, and any other suitable relation type. In some instances, each selectable relationship type may include a source entity type and value and a target entity type and value to indicate entities linked by the relationship type. A user interface containing selectable interface elements for each constraint class, type, and value may be presented to a user. Selection of one or more interface elements may include one or more constraint classes in the set of service properties.

For example, property type classes may be designated to implicitly capture cost and effort for modernization of an increment. A property type class of code complexity may represent cyclomatic complexity for each included program. An objective associated with a code complexity property class may be defined to minimize cyclomatic complexity to ensure that all transactions from an application are included. A property type class of operations may represent transaction volumes. The transaction volumes may be represented as a number of transactions being above a specific number of transactions per day. A property type class of database access types may be defined to minimize operations on certain tables, files, or fields on tables that belong to a specified application. A property type class can represent boundary notations. Transactions can span multiple applications. Modernization of applications into services may be constrained on applications based on boundaries. In such instances, incremental analysis may determine dependencies of resources or artifacts that are considered inside or outside of a specified boundary. In some instances, generic constraint specification is supported by enabling configurable functions and predicates. The configuration may be supported for an artifact, a relation, or combinations thereof.

Objective classes may include context, objective function, aggregate function, entity type, and relationship type. Context classes may include database access, complexity, operational, boundary, and any other suitable context. Objective function classes may include maximize function, minimize function, argument max, argument, min, and any other suitable function. Aggregate function classes may include count, minimum, maximum, sum, and any other suitable aggregate function. Entity type classes may include program, transaction, application, table, and any other suitable entity type. Relationship type classes may include write access, read access, outsideIn, belongsTo, and any other suitable relation type. In some instances, each selectable relationship type may include a source entity type and value and a target entity type and value to indicate the entities linked by the relationship type. A user interface containing selectable interface elements for each objective class, type, and value may be presented to a user. Selection of one or more interface elements may include one or more objective classes in the set of service properties.

At operation 220, the resource component 120 determines a subset of resources. In some embodiments, the subset of resources is determined based on the set of service properties. The subset of resources are resources to be included in the service.

In some embodiments, the resource component 120 determines the subset of resources by performing code analysis on an application of the set of applications which is to be modernized by the increment analysis system 102. In some instances, the resource component 120 may perform code analysis using application discovery and delivery intelligence (ADDI®). In such instances, the resource component 120 models application code as artifacts and relations. Predicates may be generated from the code model to indicate levels of dependence between elements of the application code. The resource component 120 may then translate the set of service properties as constraints and objectives. The resource component 120 may then translate the constraints and objectives to the predicates and generate a formal notation. The resource component 120 may then apply a constraint solver to determine the subset of resources applicable to the set of service properties based on the predicates and formal notation. Although referenced with respect to a specific code analysis methodology, it should be understood that the resource component 120 may be performed using any suitable code analysis method, technique, program, or functionality capable of or configured to identify resources and dependencies within code of an application to be modernized. Using code analysis, the resource component 120 may suggest programs and resources to be included in a service increment to be generated by the increment analysis system 102.

In some embodiments, the predicates and functions may be pre-computed using one or more code analysis methods. The resource component 120 may generate sets of entities including programs, tables, and transactions from the code analysis of an application of the set of applications. Entities may represent a portion of predicates identified by the resource component 120. For example, the resource component 120 may generate an entity set for programs such as Program={ . . . , "LGTESTP1", . . . }. The resource component 120 may generate an entity set of tables such as Table={ . . . , CustTable, . . . }. The resource component 120 may generate an entity set of transactions such as Transactions={ . . . . , SSP1, . . . }.

Each entity predicate (e.g., programs, tables, functions, etc.) may include entity properties. Entity properties may also be predicates identified through code analysis. Entity properties may include a name, a type, a complexity, and any other suitable properties. For example, entity properties for a program predicate may include a name, represented as name(prog, "LGTESTP1"); a type, represented as type (prog, "Program"); and a complexity, represented as a number pre-computed as part of static analysis. In some instances, the complexity property is generated as a number. The complexity number may be generated by defining functions capturing information at an individual entity level and assigning a number or value to that information. For example, functions within the program may be identified and assigned values such as, cyclo(prog1)=3, loc(prog)=100. The resource component 120 may determine entity relationship predicates through the code analysis process. The entity relationships may indicate links, dependencies, uses, and operations relating identified entities. For example, the resource component 120 may represent entity relationships as link(prog1,prog2), uses(prog1, tab1), calls(tran1, prog1).

The resource component 120 may generate call graph predicates. In some embodiments, root type entities are identified first. For example, transaction names and job names may be roots as they trigger complete call flows to carry out functions. The resource component 120 may create deduced entity types call CallGraphs using prescribed models, such as root(cg)=SSP1. Call graph dependencies may be identified between roots and other entity artifacts in respective call graphs or within a single call graph. The dependencies may be pre-computed using data from static analysis. Call graph predicates may be created to capture containment relationships, such as belongsTo ("LGTESTP1",cgraph1). Meta information may be captured in call graph predicates. For example, meta information may be represented as size(cg), numProgs(cg), numTables(cg), root(cg).

In some embodiments, the resource component 120 generates boundary predicates during code analysis. The boundary predicates may be based, at least in part, on call graphs. A call graph for transactions and job steps may be the smallest units that form boundaries. Applications may include or cross other types of boundaries. In some instances, user defined boundaries may be identified. Multiple applications may interact together in a client system. Applications may form natural boundaries, but other logical boundaries may be defined by clients like business processes. These boundaries may define internal and external contexts. In some embodiments, the resource component 120 computes one hop outside-in dependencies to call graphs. For each entity which satisfies the outside-in hop with regards to a call graph, an outsideIn predicate is created, such as outsideIn("LGTESTC1", cg2). In some instances, each artifact has a "belongsTo" relationship with an application or business model. The "belongsTo" relationship may be captured as a predicate in belongsTo(cg1, lg1).

In some instances, the resource component 120 generates database access predicates. Create, read, update, delete operations may be pre-computed with regard to tables for different artifacts with which the operations have relationships. In some instances, these predicates are captured as Update(cg, table1), Update(prog1, table1), Create(prog1, tab1) and other suitable representations.

In embodiments where the resource component 120 translates the constraints and objectives to the predicates in a formal notation, the resource component 120 may identify constraints from the set of service properties that were selected using user interface tools. The resource component 120 may formally interpret the constraint by mapping the constraint to one or more corresponding predicates and functions. For example, the set of service properties may include selections for objectives including: Scope="Boundary" and Objective Function="Maximize" and Aggregate Function="Count" and Entity Type="Transaction". The set of service properties may also include selections for constraints including: Property Type="Boundary" and Relationship Type="OutsideIn" and Source Entity Type="Program" and Target Entity Type="CallGraph" and Constraint Type="Not Exist". The resource component 120 may translate the constraints and objectives to formal notation, as shown below.

--- maximize (count(type(tran_i, "Transaction"))) s.t.
    Exists cg in CallGraph: root(cg)=tran_i and (forall p in Program :
    (neg(outsideIn(p,cg) or belongsTo(p, cg))))

---

In some embodiments, the resource component 120 determines the subset of resources by first determining a set of seed resources. The set of seed resources may be one or more seed resources. The resource component 120 may determine the set of seed resources based on the set of service properties. A seed resource may be a high importance resource of the subset of resources identified based on the set of service priorities. For example, a seed resource may be an entry point, a transaction, a program, a table, or a file which has a high level of importance based on the set of service priorities. In instances where the set of seed resources are a plurality of seed resources, the plurality of seed resources may be a set of most important resources determined based on the set of service priorities.

In some embodiments, the resource component 120 identifies a set of dependent resources. The set of dependent resources is determined based on the set of seed resources. The set of dependent resources may be identified as resources which are dependent on seed resources. The set of dependent resources may be determined based on the constraint solver being applied to the predicates, formal notation, and the previously identified seed resources.

At operation 230, the graph component 130 generates a resource graph of the subset of resources. The resource graph is generated based on the subset of resources and the set of service properties. In embodiments where the resource component 120 determines the subset of resources as a set of seed resources and a set of dependent resources, the graph component 130 generates the resource graph as including one or more seed resources for the service increment. In some instances, the graph component 130 generates the resource graph to include one or more seed resources for the service agreement and a subset of dependent resources. The subset of dependent resources, included in the resource graph, may be dependent resources associated with each seed resource of the one or more seed resources.

At operation 240, the service component 140 generates a service increment. The service increment is generated to include at least a portion of the subset of resources. In some embodiments, the service increment is generated based on the resource graph and the set of service properties. The service increment may include seed resources and dependent resources. The service increment may be a portion of a monolithic application. In some instances, the increment spans logical boundaries. Spanning logical boundaries may be based on the set of service properties selected by a user. In some embodiments, the service component 140 generates the service increment as a solution to an optimization problem formulated from the predicates, functions, and resources to satisfy requirements defined by the set of service properties.

Where the service increment is generated as a solution to an optimization problem, the constraints may be solved generally by inputting pre-computed predicates, objectives, and constraints into the service component 140. A template-based interpreter within the service component may interpret each combination into a target system formalization. The target system formalization may be fed to a constraint solver engine within the service component 140. The constraint solver engine may provide an output as an increment which satisfies the set of service properties received in operation 210.

The service increment may be generated by initially including one or more seed resources. The service increment may be expanded with dependent resources associated with the initially included one or more seed resources. In some instances, the user is provided with the service increment or a representation thereof indicating included seed and dependent resources and associated boundary dependencies. The user may be provided a user interface configured to enable checking or verification of one or more boundary dependencies of the service increment based on the set of service properties selected by the user. The user interface may be configured to enable the user to edit the service increment, the one or more boundary dependencies, or the set of service properties initially selected by the user. The edits may be performed based on a current understanding of the service increment. Once edited, the service component 140 may generate a second iteration of the service increment (e.g., a modified service increment).

In some embodiments, the service component 140 performs a set of operations in generating the service increment. In such instances, the service component 140 determines a boundary for the service increment. The boundary may include a set of internal resources. The set of internal resources may represent at least a portion of the subset of resources included in the service increment.

The service component 140 determines a set of external resources associated with the set of internal resources. The set of external resources may be determined as being external to the boundary of the service increment.

In some embodiments, once the service increment is generated, a git project may be created. Once the git project is created, the increment analysis system 102 may initialize modernization of a portion of an application associated with the service increment.

By way of example, a set of service properties may indicate an intent to generate increments based on code complexity and an objective of finding transactions that satisfy specified constraints, such as code complexity below a designated value. The set of service properties may include a constraint indicating cyclomatic code complexity for a program may be less than a specified value. The increment may be output as an increment containing transactions whose call graph satisfies the above-referenced constraints and objectives. The increment generated in the example may be represented as a formalized set of service properties including objectives and constraints. The formalized objectives may be represented as Scope: "Boundary", Objective Function="Maximize", Aggregate Function="Count", and Entity Type="Transaction", tran_i. The formalized constraints may be represented as Property Type='Complexity'; Entity Type='Program', p; Aggregation='Single', cc; Constraint Type='greater', 10 AND PropertyType='Boundary'; RelationshipType='BelongsTo'; sourceEntity Type='Program', p; and targetEntity Type='CallGraph', cg(tran_i). In some instances, the increment may be formalized or partially formalized as: maximize (count(type(tran_i, "Transaction") s.t. exists cg in CallGraph, p in Program: root(cg)=tran_i and belongsTo(p, cg) and cc(p)>10.

By way of further example, a set of service properties may indicate an intent to hollow an old function "KYC Paper Validation" that is not currently applicable due to transitioning away from softcopies. The set of service properties may contain a boundary indication of "Transaction: BKY3". The set of service properties may allow for removal of programs that are specific to the indicated transaction, where no other transactions depend on them. The increment may be output and contain a list of programs that meet the above-referenced specification. The constraints within the set of service properties may be formally interpreted by mapping to corresponding predicates and functions. The increment specification may be represented as a set of objectives including: Scope="Boundary"; Objective Function="Maximize"; Aggregate Function="Count"; Relationship Type="Belongs"; source Entity Type="Program", p_i; and target Entity Type="CallGraph", cg("BKY3"). Constraints for the increment specification may be represented as: PropertyType='Boundary' and (RelationshipType='OutsideIn' and SourceEntity Type='Program',p_k and TargetEntity Type='CallGraph', cg("BKY3")) AND (RelationshipType='Link' and SourceEntity Type='Program',p_k and TargetEntity Type='Program', p_i) and Constraint Type='Not exist'. In some instances constraints may be represented as: PropertyType='Boundary' and (RelationshipType='OutsideIn' and SourceEntity Type='Transaction',t_k and TargetEntity Type='CallGraph', cg("BKY3")) AND (RelationshipType='Calls' and SourceEntity Type='Transaction',t_k and TargetEntity Type='Program', p_i) and Constraint Type='Not exist'. The constraints and objectives of the set of service properties may be translated into an increment formalized as: maximize (count(belongsTo(p_i,cg_j) and type(p_i,"Program") and root(cg_j)="BKY3")) s.t. not Exists (p in Program) s.t. (outsideIn(p, cg_j) and link(p,p_i)) not Exists (tran in Transaction) s.t. (outsideIn(tran,cg_j) and calls(tran,p_i)).

FIG. 3 shows a flow diagram of an embodiment of a computer-implemented method 300 for automated increment analysis of legacy applications. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the property component 110 receives a first set of service properties for a service. In some embodiments, operation 310 may be performed in a manner similar to or the same as described above with respect to operation 210.

In operation 320, the resource component 120 determines a subset of resources. In some embodiments, operation 320 may be performed in a manner similar to or the same as described above with respect to operation 220.

In operation 330, the graph component 130 generates a resource graph of the subset of resources. In some embodiments, operation 330 is performed in a manner similar to or the same as described above with respect to operation 230.

In operation 340, the service component 140 generates a service increment. In some embodiments, operation 340 is performed in a manner similar to or the same as described above with respect to operation 240. For example, if the objective is to find transactions that perform update operations on tables belonging to an application only, the increment may be modeled as shown below. In the modeled increment, x_i may be a decision var of type call graph.

```
Maximize (count(type(tr_i, "Transaction"))) s.t.
    exists (t in Table and cg in CallGraph) s.t. Update(cg, t) and
    root(cg)=tr_i
    not exists (t in Table and app in Application and cg in CallGraph) s.t.
    (root(cg)=tr_i and belongsTo(t, cg) and belongsTo(tr_i, app) and not
    belongsTo(t, app))
```

In some embodiments, the resource component 120 performs predicate projection on the service increment. The predicate projection may identify and map predicates potential additional service properties, functions, boundaries, and other aspects to be added to currently selected service properties in the presently generated service increment.

In operation 350, the property component 110 receives a second set of service properties for the service. The second set of service properties may be translated into constraints and objectives. In some embodiments, operation 350 is performed in a manner similar to operations 210 or 310.

In some instances, constraints, objectives, and other service properties presented within a user interface for selection as part of the second set of service properties. For example, the constraints may be specific to artifacts within the generated service increment of operation 340. An input list of predicates may be filtered to contain predicates applicable for the service increment. The input list may be presented within the user interface for inclusion as part of the second set of service properties. For example, a user may want to find transaction cg that minimizes update operations to a table "cust." Such an increment may be modeled from selections by the user of predicates in the second set of service properties.

In operation 360, the service component 140 modifies the service increment based on the second set of service properties to generate a modified service increment. In some instances, the constraints and objectives may be translated into predicates and formal notation. The constraints and objectives may be subject to a constraint solver using the predicates and formal notation to identify seeds and dependent resources for a subsequent service increment based on the second set of service properties. In some embodiments, operation 360 is performed in a manner similar to operations 240 and 340 and incorporating the second set of service properties and resources identified based thereon.

As in the example discussed above, the increment may be modeled as shown below. In the increment modeled below, x may be a decision var of type call graph and "incr" may be a set of entities from the first generated service increment.

$$\arg\min x \ (1\text{-Update}(x, \text{'cust'})) \ \text{s.t.}$$
$$\text{exists} \ (x \ \text{in incr}) \ \text{s.t. type}(x, \text{"callgraph"})$$

In some embodiments, the service component 140 modifies the service increment by pruning the subset of resources to generate a second subset of resources. The second subset of resources are pruned and generated based on the second set of service properties.

Service increments may be modeled using constrained programming languages supported by optimization solvers. Any suitable and relevant optimization solver may be used, such as SPSS® ILOG®.

Figure 4:
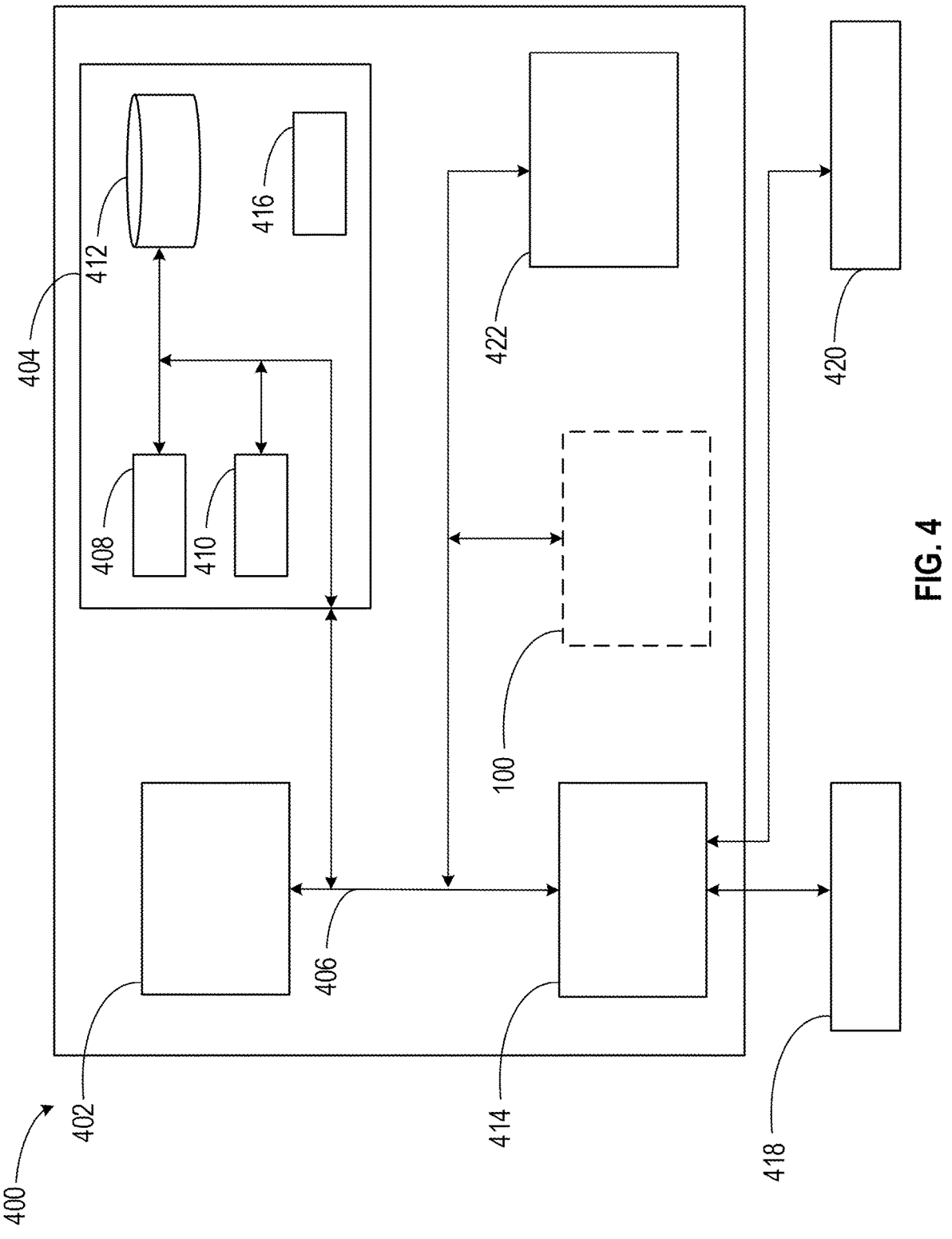
FIG. 4 depicts a block diagram of a computing system for automated increment analysis of legacy applications, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for automated increment analysis of legacy applications.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the property component 110, the resource component 120, the graph component 130, and the service component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414.

Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
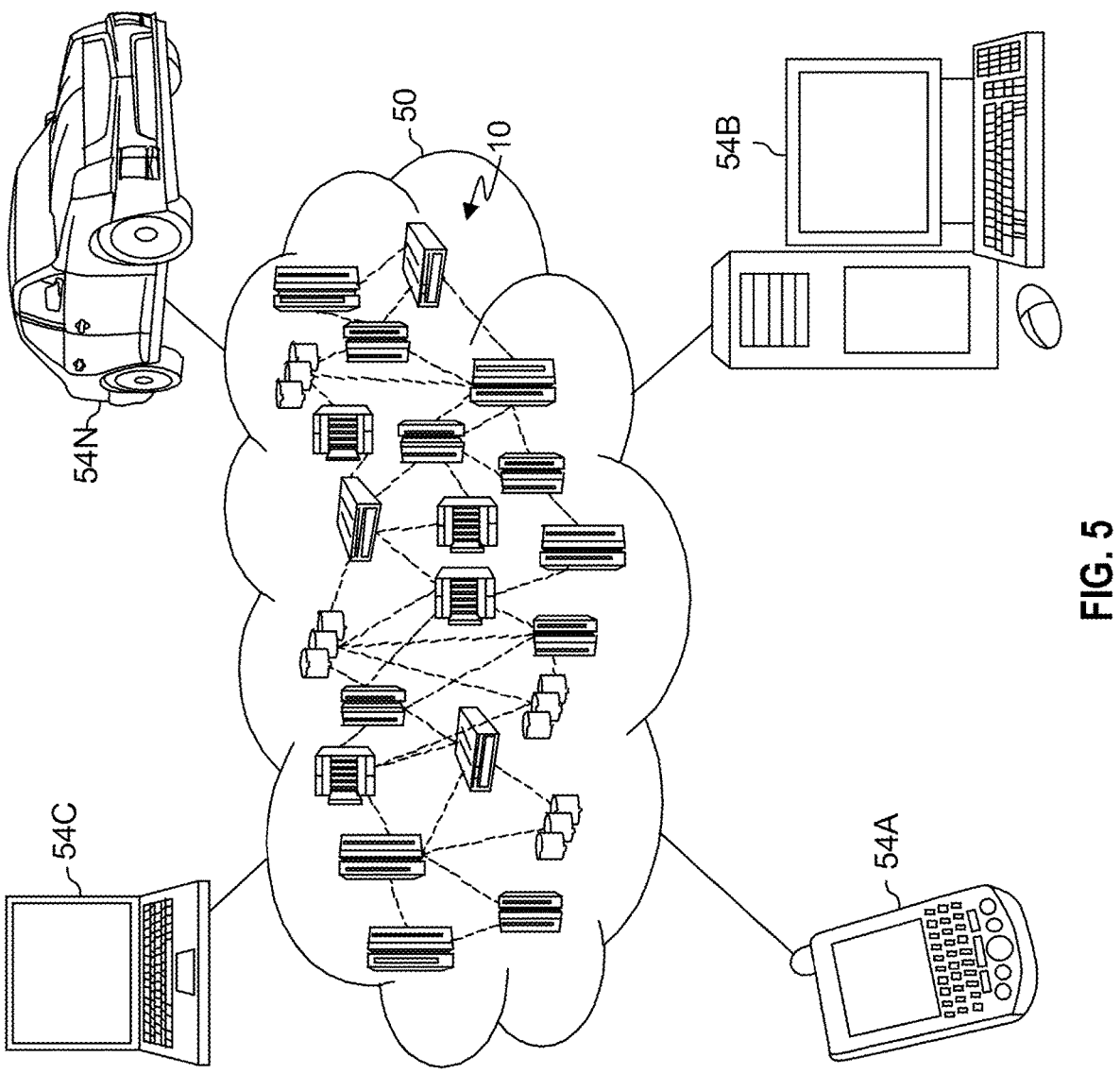
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
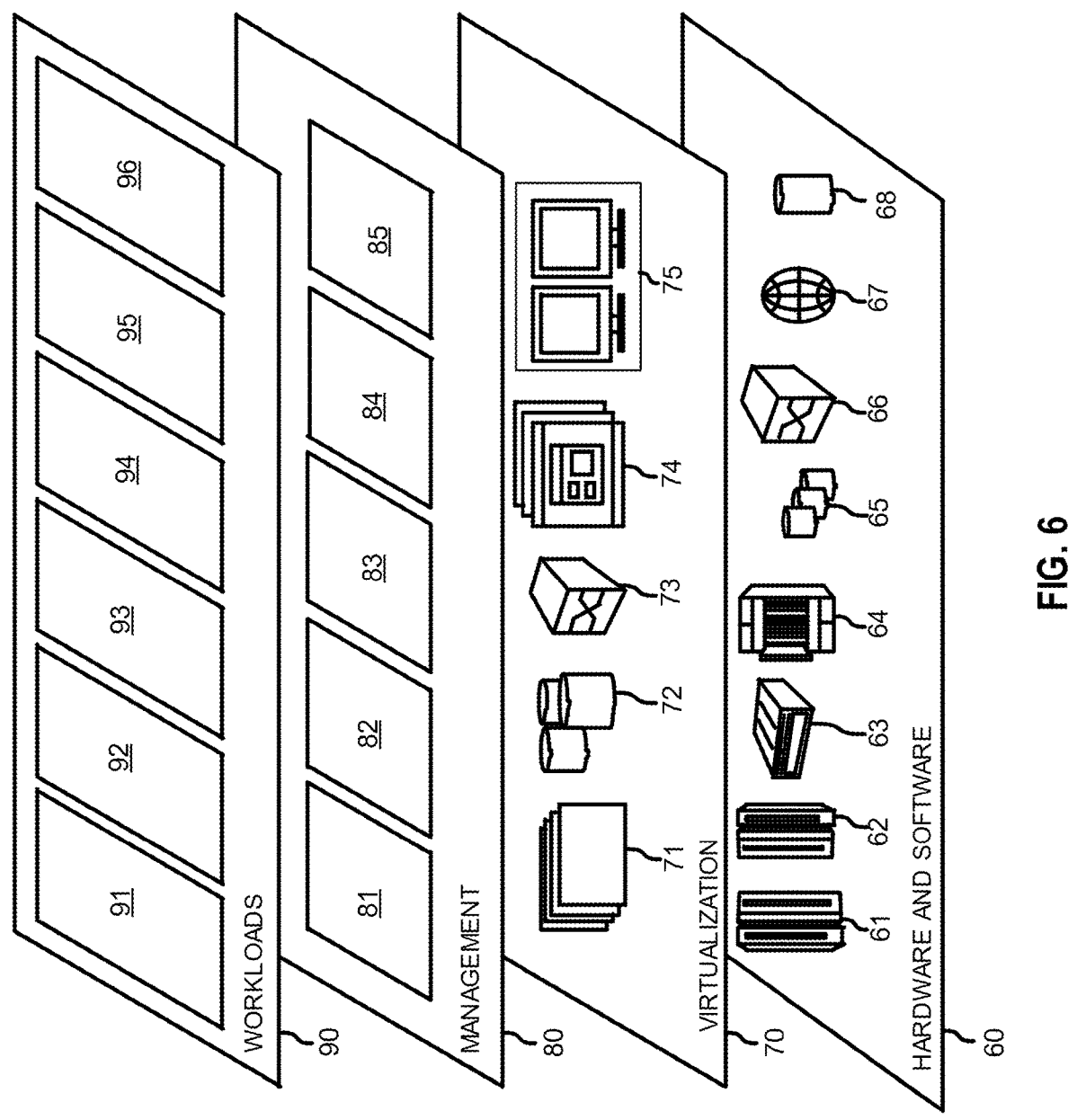
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and increment processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a set of service properties for a service to be generated from a set of applications, the set of applications associated with a set of resources, wherein the set of service properties include a set of objectives and constraints for a modernization of the set of applications, and the set of service properties are specified as a set of objectives and a set of requirements and constraints of a service increment;
determining a subset of resources based on the set of service properties, the subset of resources to be included in the service, wherein the determining includes performing a code analysis of the set of service properties and identifying a relationship between the set of service properties;
generating a resource graph of the subset of resources based on the subset of resources and the set of service properties that indicates the relationship;
converting the set of objectives and the set of constraints to a set of predicates and generate a formal notation for the predicates; and
generating, based on the resource graph and the formal notation, a service increment including a portion of the subset of resources based on the resource graph and the set of service properties, wherein the service increment is a portion of the modernization, and the service increment is based on an optimization of the formal notation and predicates in meeting specified requirements defined by the service properties.

2. The method of claim 1, wherein determining the subset of resources further comprises:
determining a set of seed resources based on the set of service properties; and identifying a set of dependent resources based on the set of seed resources.

3. The method of claim 2, wherein the resource graph includes one or more seed resources for the service increment and a subset of dependent resources associated with each seed resource of the one or more seed resources.

4. The method of claim 1, wherein the set of service properties are a first set of service properties, the method further comprising:

receiving a second set of service properties for the service; and modifying the service increment based on the second set of service properties to generate a modified service increment.

5. The method of claim 4, wherein the subset of resources is a first subset of resources and modifying the service increment to generate the modified service increment further comprises:

pruning the subset of resources to generate a second subset of resources based on the second set of service properties.

6. The method of claim 1, wherein generating the service increment further comprises:

determining a boundary for the service increment, the boundary including a set of internal resources representing at least a portion of the subset of resources; and determining a set of external resources associated with the set of internal resources, the set of external resources being external to the boundary of the service increment.

7. The method of claim 1, wherein the set of constraints are based on a service type and an entity type.

8. A system, comprising:

one or more processors; and a computer-readable storage medium, coupled to the one or more processors, storing program instructions that, when executed by the one or more processors, cause the one or more processors to perform operations comprising:

receiving a set of service properties for a service to be generated from a set of applications, the set of applications associated with a set of resources, wherein the set of service properties include a set of objectives and constraints for a modernization of the set of applications, and the set of service properties are specified as a set of objectives and a set of requirements and constraints of a service increment;

determining a subset of resources based on the set of service properties, the subset of resources to be included in the service, wherein the determining includes performing a code analysis of the set of service properties and identifying a relationship between the set of service properties;

generating a resource graph of the subset of resources based on the subset of resources and the set of service properties that indicates the relationship;

converting the set of objectives and the set of constraints to a set of predicates and generate a formal notation for the predicates; and generating, based on the resource graph and the formal notation, a service increment including a portion of the subset of resources based on the resource graph and the set of service properties, wherein the service increment is a portion of the modernization, and the service increment is based on an optimization of the formal notation and predicates in meeting specified requirements defined by the service properties.

9. The system of claim 8, wherein determining the subset of resources further comprises:

determining a set of seed resources based on the set of service properties; and identifying a set of dependent resources based on the set of seed resources.

10. The system of claim 9, wherein the resource graph includes one or more seed resources for the service increment and a subset of dependent resources associated with each seed resource of the one or more seed resources.

11. The system of claim 8, wherein the set of service properties are a first set of service properties, the operations further comprising:

receiving a second set of service properties for the service; and modifying the service increment based on the second set of service properties to generate a modified service increment.

12. The system of claim 11, wherein the subset of resources is a first subset of resources and modifying the service increment to generate the modified service increment further comprises:

pruning the subset of resources to generate a second subset of resources based on the second set of service properties.

13. The system of claim 8, wherein generating the service increment further comprises:

determining a boundary for the service increment, the boundary including a set of internal resources representing at least a portion of the subset of resources; and determining a set of external resources associated with the set of internal resources, the set of external resources being external to the boundary of the service increment.

14. A computer program product comprising a computer readable storage medium having program instructions embodied therewith, the program instructions being executable by one or more processors to cause the one or more processors to perform operations comprising:

receiving a set of service properties for a service to be generated from a set of applications, the set of applications associated with a set of resources, wherein the set of service properties include a set of objectives and constraints for a modernization of the set of applications, and the set of service properties are specified as a set of objectives and a set of requirements and constraints of a service increment;

determining a subset of resources based on the set of service properties, the subset of resources to be included in the service, wherein the determining includes performing a code analysis of the set of service properties and identifying a relationship between the set of service properties;

generating a resource graph of the subset of resources based on the subset of resources and the set of service properties that indicates the relationship;

converting the set of objectives and the set of constraints to a set of predicates and generate a formal notation for the predicates; and generating, based on the resource graph and the formal notation, a service increment including a portion of the subset of resources based on the resource graph and the set of service properties, wherein the service increment is a portion of the modernization, and the service increment is based on an optimization of the formal notation and predicates in meeting specified requirements defined by the service properties.

15. The computer program product of claim 14, wherein determining the subset of resources further comprises:

determining a set of seed resources based on the set of service properties; and identifying a set of dependent resources based on the set of seed resources, and wherein the resource graph includes one or more seed resources for the service increment and a subset of dependent resources associated with each seed resource of the one or more seed resources.

16. The computer program product of claim 14, wherein the set of service properties are a first set of service properties, the operations further comprising:

receiving a second set of service properties for the service; and modifying the service increment based on the second set of service properties to generate a modified service increment.

17. The computer program product of claim 16, wherein the subset of resources is a first subset of resources and modifying the service increment to generate the modified service increment further comprises:

pruning the subset of resources to generate a second subset of resources based on the second set of service properties.

18. The computer program product of claim 14, wherein generating the service increment further comprises:

determining a boundary for the service increment, the boundary including a set of internal resources representing at least a portion of the subset of resources; and determining a set of external resources associated with the set of internal resources, the set of external resources being external to the boundary of the service increment.

\* \* \* \* \*